United States Patent [19]

Cavezzan et al.

[11] Patent Number: 5,502,084
[45] Date of Patent: Mar. 26, 1996

[54] ORGANOPOLYSILOXANE COMPOSITION CONTAINING A CYCLOPENTENYL RADICAL AND CROSSLINKABLE IN A THIN LAYER UNDER ULTRAVIOLET

[75] Inventors: Jacques Cavezzan; Jean-Marc Frances, both of Villeurbanne, both of France

[73] Assignee: Rhone-Poulenc Chimie, Courbevoie, France

[21] Appl. No.: 616,942

[22] Filed: Nov. 21, 1990

[30] Foreign Application Priority Data

Nov. 21, 1989 [FR] France ................... 89 15529

[51] Int. Cl.$^6$ .................... C08G 77/12; C08G 77/20; C08F 2/50
[52] U.S. Cl. .................. 522/99; 528/31; 528/32; 556/410; 556/426; 556/438; 556/465
[58] Field of Search ............... 522/99, 148, 172; 556/465, 438, 410, 426; 528/31, 32

[56] References Cited

U.S. PATENT DOCUMENTS

| | | | |
|---|---|---|---|
| 4,107,390 | 8/1978 | Gordon et al. | 428/447 |
| 4,587,136 | 5/1986 | White et al. | 522/99 |
| 4,611,042 | 9/1986 | Rivers-Farrell et al. | 528/32 |
| 4,728,687 | 3/1988 | Watanabe et al. | 524/448 |
| 5,034,490 | 7/1991 | Jacobine et al. | 522/99 |
| 5,118,724 | 6/1992 | Frances et al. | 522/172 |
| 5,194,489 | 3/1993 | Frances et al. | 524/731 |

FOREIGN PATENT DOCUMENTS

| | | |
|---|---|---|
| 0180843 | 5/1986 | European Pat. Off. . |
| 0261520 | 9/1987 | European Pat. Off. . |
| 0282927 | 9/1989 | European Pat. Off. . |
| 1058022 | 2/1967 | United Kingdom . |

OTHER PUBLICATIONS

Nogaydeli, A. I. et al; "Synthesis of polylorganosiloxanes) with dicyclopentenyl radicals at the silicon atoms"; Chemical Abstract Jul. 23, 1979, vol. 91, No. 4.

*Primary Examiner*—Susan W. Berman
*Attorney, Agent, or Firm*—Burns, Doane, Swecker & Mathis

[57] ABSTRACT

The present invention relates to an organopolysiloxane composition containing a cyclopentenyl radical and crosslinkable in a thin layer by exposure to ultraviolet light, characterized in that it comprises:

A. 100 parts of diorganopolysiloxane containing at least 3 cyclopentenyl radicals per molecule, each of these groups being directly linked, by an SiC bond, to a different silicon atom, and B. an effective amount of at least one photoinitiator.

Application of the compositions to the production of coatings, especially for the production of non-stick coatings on paper, and for the encapsulation of printed circuits.

8 Claims, No Drawings

ORGANOPOLYSILOXANE COMPOSITION CONTAINING A CYCLOPENTENYL RADICAL AND CROSSLINKABLE IN A THIN LAYER UNDER ULTRAVIOLET

The present invention relates to an organopolysiloxane composition which is crosslinkable in a thin layer by exposure to ultraviolet light (under ultraviolet).

There already exist numerous patent documents describing organopolysiloxane compositions which crosslink in a thin layer under ultraviolet.

Amongst this state of the art there may be mentioned:

FR-A-2 245 729: the organopolysiloxane carries SiH and sivinyl groups,

FR-A-2 517 684: the organopolysiloxane carries an alkylamino group,

FR-A-2 526 800: the organopolysiloxane carries epoxy and/or acrylate groups, and FR-A-2 447 386: the organopolysiloxane carries a mercapto group.

A person skilled in the art, using organopolysiloxane compositions which are crosslinkable in a thin layer under ultraviolet, seeks a silicone composition which in particular exhibits the following properties:

it crosslinks under ultraviolet without it being necessary additionally to apply heat by infrared irradiation, it is stable on storage and when exposed to the atmosphere has a sufficiently long pot life before becoming hardened (at least several days), it crosslinks under ultraviolet after the shortest possible exposure time, it adheres suitably to the carrier, it preferably does not contain metallic catalysts, it can be used undiluted, that is to say without an organic solvent, and it can harden regardless of whether the coating layer is very thin (a few μm or a few tens of μm), or is relatively thick (a few millimeters).

The precise object of the present invention is to propose a composition which in particular exhibits all the above properties, and this object is achieved by the present invention, which in fact relates to an organopolysiloxane composition which contains a cyclopentenyl radical and is crosslinkable in a thin layer by exposure to ultraviolet light, characterized in that it comprises:

A. 100 parts of diorganopolysiloxane containing at least 3 cyclopentenyl radicals per molecule, each of these groups being directly linked, by an SiC bond, to a different silicon atom, and B. an effective amount of at least one photoinitiator.

The polymer (A) preferably corresponds to the formula:

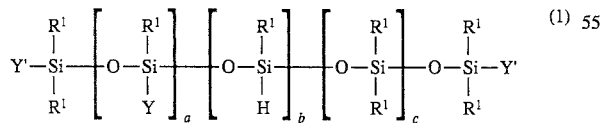

in which:

Y represents a cyclopentenyl radical chosen from among those of the formula:

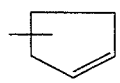

i

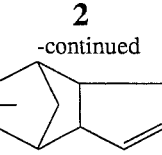

ii

iii $R^1$ is a monovalent hydrocarbon radical, at least 50% of the number of $R^1$ radicals being methyl and/or phenyl, Y' is Y or $R^1$, a is an integer between 1 and 50 inclusive, b is an integer between 0 and 50 inclusive, and c is an integer between 0 and 1,000, preferably between 10 and 500, with the proviso that if a=1, Y' is Y, and if a=2, at least one of the 2 Y' is Y.

The polymer of the formula (1) is substantially linear and its siloxane chain units are distributed randomly, in sequences or in blocks.

However, the presence in the chain of siloxane units of the formula $R^1SiO_{1.5}$ is not excluded, provided their content by numbers is at most 5%.

The radicals $R^1$ are more specifically chosen from among the $C_1$-$C_5$ alkyl radicals and phenyl.

The preferred polymers of the formula, (1) are those which carry the radical of the formula ii and which are in the form of more or less viscous oils and accordingly have a viscosity of 25° C. at less than 500,000 mPa.s. The preferred viscosity region is situated at between 1,000 and 250,000 mPa.s, it being understood that a mixture of polymers (1) of different viscosities can be used, the viscosity of the mixture having to be preferably less than 500,000 mPa.s.

There are several processes by means of which the polymer of the formula (1) may be obtained.

According to a first process, a polymer of the formula:

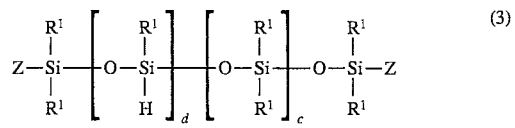

in which:

$R^1$ and c have the same meaning as in formula (1) above, d=a+b, and

Z is $R^1$ or H, and if d=1, the two Z are H, and if d=2, at least one of the Z is H, is subjected to an at least partial hydrosilylation reaction with dicyclopentadiene or its oligomers, in particular those chosen from among the formulae:

iv

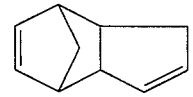

v

vi in the presence of a catalytically effective quantity of a platinum catalyst.

The platinum catalysts used to carry out the hydrosilylation reaction of the polymers of the formula (3) with cyclopentadiene or its oligomers, of the formulae iV, V and Vi, are extensively described in the literature, and there may in particular be mentioned the complexes of platinum and an organic product, described in American Patents U.S. Pat. Nos. 3,159,601, 3,159,602, 3,220,972 and European Patents EP-A-57 459, EP-A-188 978 and EP-A-190 530, and the complexes of platinum and a vinylated organopolysiloxane, described in American Patents U.S. Pat. Nos. 3,419,593, 3,715,334, 3,377,432 and 3,814,730.

In order to react the polymer containing SiH groups, of the formula (3), with cyclopentadiene there is generally used an amount of platinum catalyst, calculated as weight of platinum metal, of between 5 and 600 ppm, preferably between 10 and 200 ppm, relative to the weight of polymer with SiH groups, of the formula (3).

The hydrosilylation reaction can be carried out in bulk or in a volatile organic solvent such as toluene, heptane, xylene, tetrahydrofuran and tetrachloroethylene.

It is generally desirable to heat the reaction mixture to a temperature of 60° to 120° C. for the time required to complete the reaction. Furthermore, it is desirable to add the polymer containing SiH groups dropwise to the cyclopentadiene dissolved in an organic solvent.

The extent to which the reaction has progressed is verified by determining the residual SiH groups with alcoholic potassium hydroxide, and thereafter the solvent is removed by, for example, distillation under reduced pressure.

The crude oil of the formula (1) can be purified, for example by passing it over an absorbent silica column.

Another process for the preparation of the polymers of the formula (1), for the case where $b=0$, consists of carrying out the homocondensation and/or cocondensation, followed optionally by an equilibration stage, of a reactant containing at least one silane of the formula:

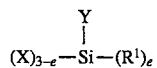

(5)

in which Y and $R^1$ have the meaning given in formula (1), e is 1 or 0 and X represents a hydrolysable group such as a chlorine atom or a $C_1$–$C_4$ alkoxy group. In the case of the co-condensation, the other silane can be a compound of formula $(X)_{3-e}$—Si—$(R^1)_e$, in which X, e and $R^1$ have the meanings given above in formulae (1) and (5).

Such a process is described in detail in European Patent EP-A-261 520, cited as a reference.

As the photosensitizer, it is recommended to use a mixture, preferably of 50/50 by weight, of benzophenone and 1-hydroxycyclohexyl phenyl ketone or the MICHLER ketone of the formula

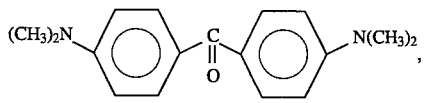

mixed, preferably 50/50 with benzophenone.

However, other photosensitizers can be used and include, for example, 2-hydroxy-2-methyl-1-phenylpropanone, cyclohexanone, acetophenone, propiophenone, benzophenone, xanthone, fluorenone, benzaldehyde, fluorene, anthraquinone, triphenylamine, carbazole, 3-methylacetophenone, 4-methylacetophenone, 3-pentylacetophenone, 4-methoxyacetophenone, 3-bromo-acetophenone, 4-allylacetophenone, p-diacetylbenzene, 3-methoxybenzophenone, 4-methylbenzophenone, 4-chlorobenzophenone, 4,4'-dimethoxybenzophenone, 4-chloro-4'-benzylbenzophenone, 3-chloroxanthone, 3,9-dichloroxanthone, 3-chloro-8-nonylxanthone and the like.

By an effective amount of photosensitizer there is to be understood, according to the invention, the amount which is just sufficient to photosensitize the composition, and this amount is generally between 0.01 and 20 parts by weight, most frequently between 0.1 and 8 parts, per 100 parts of the polymer (A).

The ultraviolet radiation used has a wavelength of between 200 and 400 nanometres, preferably between 254 and 360 nanometers.

The irradiation time can be very short and is generally less than 1 second, and of the order of a few hundredths of a second for low thicknesses of coatings. The crosslinking achieved is excellent even in the absence of any heating. Of course, heating at between 25° and 100° C. is not excluded from the invention.

Of course, the hardening time can be regulated, especially by the choice of the constituents (A) and (B), by the number of ultraviolet lamps used, by the duration of exposure to the ultraviolet and by the distance between the composition and the ultraviolet lamp.

The compositions according to the invention can be used as such or in solution in an organic solvent. They are used in the field of non-stick coatings on cellulosic materials, in paints, in the encapsulation of electrical and electronic components, in lithographic coatings and in coatings for textiles.

The compositions according to the invention can, in addition to (A) and (B), contain other ingredients such as pigments, fungicides, bactericides and antimicrobial agents, corrosion inhibitors and the like.

The compositions according to the invention are preferably used as solvent-free compositions to render a material such as a metal foil, glass, plastic or paper, non-adhering to other materials to which they would normally adhere and, in the case of a solvent-free composition, the composition advantageously has a viscosity not exceeding 5,000 mPa.s and preferably between 20 and 4,000 mPa.s at 25° C.

The invention thus also relates to a process which permits sheets of flexible material to be rendered non-adherent to surfaces to which they normally adhere, which process is characterized in that it consists of applying an amount of composition according to the invention which is generally between 0.1 and 5 g per $m^2$ of the surface to be coated and of crosslinking the composition by supply of energy, of which at least a part, and preferably, all is provided by ultraviolet radiation.

The solvent-free, that is to say undiluted, compositions are applied by means of devices suitable for depositing small amounts of liquids uniformly. For example, it is possible to use for this purpose the reverse roller coating device, which in particular comprises two superposed rollers. The purpose of the lower roller, which dips into the coating tank containing the compositions, is to impregnate the upper roller with a very thin layer; the purpose of this upper roller is then to deposit on the paper the desired amounts of the compositions with which it is impregnated, the control of the amount being achieved by regulating the respective speed of the two rollers, which revolve in opposite directions to one another.

The amounts of compositions deposited on the carriers vary and most commonly range between 0.1 and 5 $g/m^2$ of treated surface. These amounts depend on the nature of the carriers and on the desired non-stick properties. They are most commonly between 0.5 and 1.5 $g/m^2$ for non-porous carriers.

Throughout the subsequent and preceding texts, the percentages and parts are by weight, unless otherwise stated.

The examples which follow illustrate the invention.

EXAMPLE 1

Preparation of the oil of the formula $$A-\underset{\underset{Me}{|}}{\overset{\overset{Me}{|}}{Si}}-O-\left[\underset{\underset{Me}{|}}{\overset{\overset{Me}{|}}{Si}}-O\right]_{250}-\left[\underset{\underset{A}{|}}{\overset{\overset{Me}{|}}{Si}}-O\right]_{5.8}-\left[\underset{\underset{H}{|}}{\overset{\overset{Me}{|}}{Si}}-O\right]_{0.37}-\underset{\underset{Me}{|}}{\overset{\overset{Me}{|}}{Si}}-A$$

with A =

97.9 g of freshly distilled dicyclopentadiene (0.74 equivalent) and 232 mg of a solution, containing 8.7% Pt, of a Pt complex, prepared according to the process described in Example 3 of American Patent U.S. Pat. No. 3,814,730 and having the formula Pt(DVTMS)$_2$, (DVTMS=1,3-divinyl-1,1,3,3-tetramethyl-disiloxane) in hexane are introduced, under an inert nitrogen atmosphere, into a three-neck reactor of 3 litres capacity, equipped with a condenser, a central stirrer system and a temperature control and regulating system.

The reaction mixture is raised to 60° C. over 45 minutes, under nitrogen throughout, after which 1,147 kg of polymethylhydrogenodimethylsiloxane of average formula:

$$H-\underset{\underset{Me}{|}}{\overset{\overset{Me}{|}}{Si}}-O-\left[\underset{\underset{Me}{|}}{\overset{\overset{Me}{|}}{Si}}-O\right]_{250}-\left[\underset{\underset{H}{|}}{\overset{\overset{Me}{|}}{Si}}-O\right]_{6.2}-\underset{\underset{Me}{|}}{\overset{\overset{Me}{|}}{Si}}-H$$

Number-average molecular mass: 19,000 are introduced (over 150 minutes) by means of a dropping funnel.

When all the material has been run in, the degree of conversion of the SiH units is 84%.

After 15 hours at 60° C. under nitrogen, the degree of conversion of the SiH units is 95%.

EXAMPLE 2

Preparation of the oil of the formula $$A-\underset{\underset{Me}{|}}{\overset{\overset{Me}{|}}{Si}}-O-\left[\underset{\underset{Me}{|}}{\overset{\overset{Me}{|}}{Si}}-O\right]_{280}-\left[\underset{\underset{A}{|}}{\overset{\overset{Me}{|}}{Si}}-O\right]_{8.6}-\left[\underset{\underset{H}{|}}{\overset{\overset{Me}{|}}{Si}}-O\right]_{0.9}-\underset{\underset{Me}{|}}{\overset{\overset{Me}{|}}{Si}}-A$$

with A =

109 g of freshly distilled dicyclopentadiene (0.824 equivalent) and 188 mg of a solution of a platinum catalyst of formula Pt (DVTMS)$_2$ in hexane (containing 8.7% of Pt), as defined in Example 1, are introduced into a three-neck reactor of 3 litres capacity.

The reactor is equipped with a condenser, a central stirrer system and a temperature control and regulating system.

The reaction mixture is heated by means of an oil bath and the apparatus is left under an inert nitrogen atmosphere at 60° C. for 45 minutes, after which 1.526 kg of polymethylhydrogenodimethylsiloxane of average formula:

$$H-\underset{\underset{Me}{|}}{\overset{\overset{Me}{|}}{Si}}-O-\left[\underset{\underset{Me}{|}}{\overset{\overset{Me}{|}}{Si}}-O\right]_{280}-\left[\underset{\underset{H}{|}}{\overset{\overset{Me}{|}}{Si}}-O\right]_{9.5}-\underset{\underset{Me}{|}}{\overset{\overset{Me}{|}}{Si}}-H$$

Number-average molecular mass: 21,000 are introduced (over 180 minutes) by means of a dropping funnel.

When all the material has been run in, the degree of conversion of the SiH units is 63.5%.

After 15 hours at 60° C. under nitrogen, the degree of conversion of the SiH units is 91%.

EXAMPLE 3

Use of the polysiloxanes prepared in Examples 1 and 2 for obtaining elastomers in thin layers on paper, after the deposited composition has been exposed to ultraviolet radiation A treatment bath is prepared by adding, to 100 parts by weight of a polyorganosiloxane oil containing a cyclopentenyl radical, according to one of Examples 1 and 2, 5 parts (by weight) of a photoinitiator consisting of:

A. 2-hydroxy-2-methyl-1-phenyl-propanone (sold under the trademark DAROCUR 1173 by Messrs. MERCK) or B. a mixture of benzophenone and 1-hydroxycyclohexyl phenyl ketone, (sold by Messrs. CIBA-GEIGY under the trademark IRGACURE 500).

The letters A and B will denote these photoinitiators in Table 1, to which reference will be made hereafter.

The mixture of polyorganosiloxane+photoinitiator is stirred vigorously at ambient temperature for 10 minutes and the composition obtained is then deposited, without use of solvent, on glassine paper (reference AV 100, from Messrs. KAMERER) by means of a MAYER bar no. 0; the deposit corresponds to 2.5 g of composition per m$^2$ of glassine paper.

This coated paper is then passed under an ultraviolet lamp, employing the FUSION SYSTEM® technology, and characterized by the absence of an electrode, and by excitation by microwaves.

On passing under the ultraviolet lamp while exposed to the atmosphere, the layer of the silicone composition is hardened and the irradiation time is measured. The ultraviolet lamp has a power of 120 W/cm. The speed of travel of the paper in m/mn is recorded.

The quality of the silicone coating obtained (on the glassine paper) is then evaluated by measuring the non-stick properties of the hardened silicone layer. To do so, the hardened silicone layer is brought into contact for 20 hours at 20° C. with an adhesive tape (TESA 4651) and for 20 hours at 70° C. with another adhesive tape (TESA 4970).

The minimum force required to detach the particular adhesive tape (TESA) from the hardened layer on the glassine paper is measured in accordance with European Standard Specification FTM no. 3. This force is expressed in Newton per m (N/m).

Secondly, the measurement of the subsequent adhesion (SA) represents the degree of polymerization of the silicone layer (SA=100% represents good polymerization). The subsequent adhesion is the ratio of two measured adhesion forces, namely one on an adhesive tape brought into contact with a substrate covered with the composition of the invention, and the other corresponding to the same adhesive tape brought into contact with a substrate not covered with the composition of the invention. This measurement is carried out in accordance with European Standard Specification FTM (FINAL TEST METHOD) No. 11.

The results obtained are shown in the table below.

In every case, the coating obtained has good non-stick properties, without rub-off, that is to say with good anchoring of the silicone to the paper.

COMPARATIVE EXAMPLE 4

The procedure followed is as in Example 3, with the only difference that the silicone product containing a cyclopentenyl radical is replaced by a commercial product sold by Messrs. GOLDSCHMIDT under reference TEGO® silicone acrylate RC 710, and having acrylate groups at the chain end and a viscosity of 200 mPa.s at 25° C. This product crosslinks under a controlled atmosphere (nitrogen). If exposed to the same conditions as in Example 3 and consequently exposed to the atmosphere, no polymerization whatsoever is observed after an exposure time of more than one second to ultraviolet.

Y represents a cyclopentenyl radical of the formula:

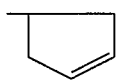    A(i)

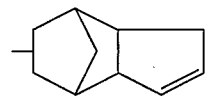    B(ii)

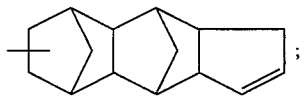    C(iii)

$R^1$ is a monovalent hydrocarbon radical, at least 50% of the number of $R^1$ radicals being methyl and/or phenyl;

Y' is Y or $R^1$;

a is an integer between 1 and 50 inclusive;

b is an integer between 1 and 50 inclusive; and c is an integer between 0 and 1,000; with the proviso that if a=1, Y' is Y; and if a=2, at least one of the two Y' groups is Y.

4. A composition according to claim 3, wherein c is an integer between 10 and 500.

TABLE

| Product prepared according to | Photo-initiator | Polymerization time (seconds) | m/mn | Non-stick character at 20° C. in N/m | at 70° C. in N/m | CA (%) |
|---|---|---|---|---|---|---|
| Example 2 | A | 0.07 | 20 | 8 | 25 | 100 |
| Example 2 | B | 0.05 | 28 | 10 | 30 | 100 |
| Example 1 | A | 0,07 | 20 | 5 | 28 | 100 |
| Example 1 | B | 0,05 | 28 | 6 | 25 | 100 |
| Example 4 | B | >1 | — | | measurable | |

A: 2-hydroxy-2-methyl-1-phenyl-propanone
B: benzophenone + 1-hydroxy-cyclohexyl phenyl ketone
m/mn: speed of travel of the paper in metres per minute.

We claim:

1. An organopolysiloxane composition comprising a cyclopentenyl radical comprising:

(a) a diorganopolysiloxane polymer comprising (i) at least 3 cyclopentenyl radicals per molecule, each of these groups being directly linked, by an SiC bond, to a different silicon atom; and (ii) at least one silicon atom to which a hydrogen atom is directly linked; and (b) an effective amount of at least one photoinitiator.

2. A composition according to claim 1, wherein said composition comprises from 0.01 to 20 parts by weight of said photoinitiator per 100 parts of said diorganopolysiloxane polymer.

3. The composition according to claim 1, wherein the polymer corresponds to the formula:

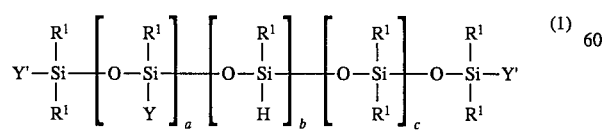

in which;

5. The composition according to claim 1, wherein the organopolysiloxane polymer is in a cross-linked state.

6. An article comprising a material coated with a composition as defined in claim 5.

7. A process for crosslinking an organopolysiloxane composition as defined in claim 1 comprising crosslinking said organopolysiloxane, spread in a thin layer, by providing ultraviolet radiation, directed at said thin layer, for at least part of the energy necessary for said crosslinking step.

8. A process for crosslinking an organopolysiloxane composition as defined in claim 1 comprising crosslinking said organopolysiloxane, spread in a thin layer, by providing ultraviolet radiation, directed at said thin layer, for at least part of the energy necessary for said crosslinking step, said organopolysiloxane composition being solvent-free and having a viscosity of less than 5,000 mPa.s. at 25° C. in an amount of between 0.1 and 5 g per m² of surface to be coated.

* * * * *